July 8, 1969  H. S. HARRISON  3,454,148
GARMENT CONVEYOR

Filed March 14, 1967  Sheet 1 of 3

INVENTOR.
HOMER S. HARRISON
BY
Barnes, Kisselle, Raisch & Choate
ATTORNEYS

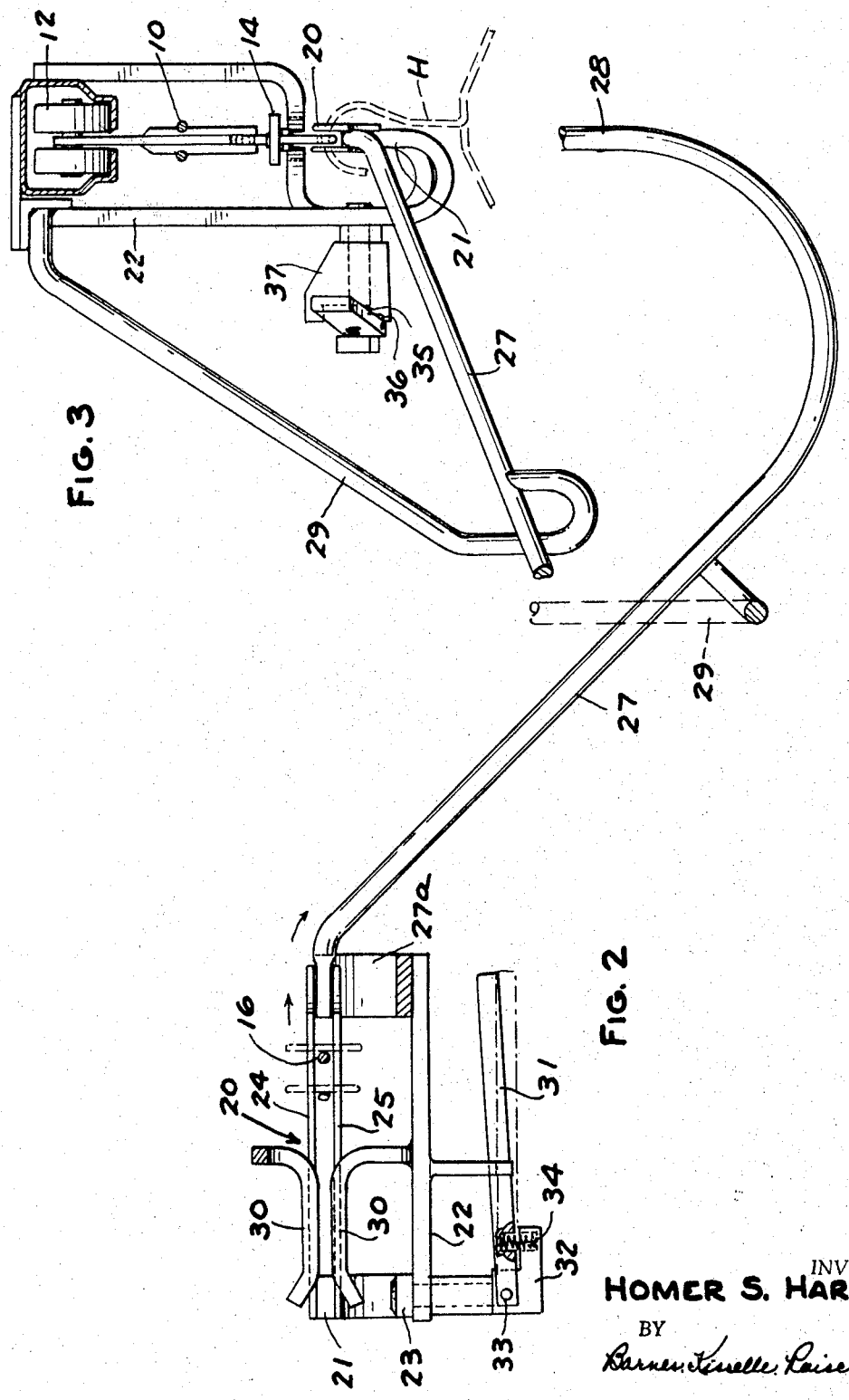

July 8, 1969      H. S. HARRISON      3,454,148

GARMENT CONVEYOR

Filed March 14, 1967      Sheet 3 of 3

INVENTOR.
HOMER S. HARRISON
BY
*Barnes, Kisselle, Raisch & Choate*

ATTORNEYS

United States Patent Office 3,454,148
Patented July 8, 1969

3,454,148
GARMENT CONVEYOR
Homer S. Harrison, Seattle, Wash., assignor, by mesne assignments, to American Chain & Cable Company, Inc., New York, N.Y., a corporation of New York
Filed Mar. 14, 1967, Ser. No. 622,989
Int. Cl. B65g 47/36, 1/12, 17/20
U.S. Cl. 198—28    8 Claims

ABSTRACT OF THE DISCLOSURE

The garment conveyor disclosed herein comprises a conveyor that has rearwardly facing hooks for supporting the hook portions of garment hangers. An unloading bar is movable into the path of the hook portions of the hangers and is operable to progressively lift the hook portions out of engaging relationship with the hooks of the conveyor as the conveyor moves along. As successive garment hangers are unloaded onto the unloading bar, they force the preceding garment hangers off the unloading bar onto a ramp that extends downwardly and laterally to an unloading station.

---

This invention relates to garment conveyors and particularly to conveyors for conveying garments that are supported on conventional garment hangers which include a hook portion and a garment supporting portion.

Background of the invention

In the handling of garments, it is common to hang the garments on conventional garment hangers having a hook portion and a garment supporting portion and to convey the garments from one position to another on a conveyor having hooks on which the hook portions of the garment hangers are engaged.

It is desirable that some simple apparatus be provided which is easily manipulatable for unloading the garments at a desired station, for example, where the garments are being manufactured or where they are being handled in a dry cleaning establishment.

Among the objects of the invention are to provide a garment conveyor embodying a relatively simple, easily constructed unloading device which is manually operable and requires a minimum of maintenance.

Summary

The garment conveyor disclosed herein comprises a conveyor that has rearwardly facing hooks for supporting the hook portions of garment hangers. An unloading bar is movable into the path of the hook portions of the hangers and is operable to progressively lift the hook portions out of engaging relationship with the hooks of the conveyor as the conveyor moves along. As successive garment hangers are unloaded onto the unloading bar, they force the preceding garment hangers off the unloading bar onto a ramp that extends downwardly and laterally to an unloading station.

Description of the drawings

FIG. 2 is a fragmentary part sectional view on an enlarged scale taken along the line 2—2 in FIG. 1.

FIG. 3 is a fragmentary sectional view on an enlarged scale taken along the line 3—3 in FIG. 1.

Description

Figure 1:
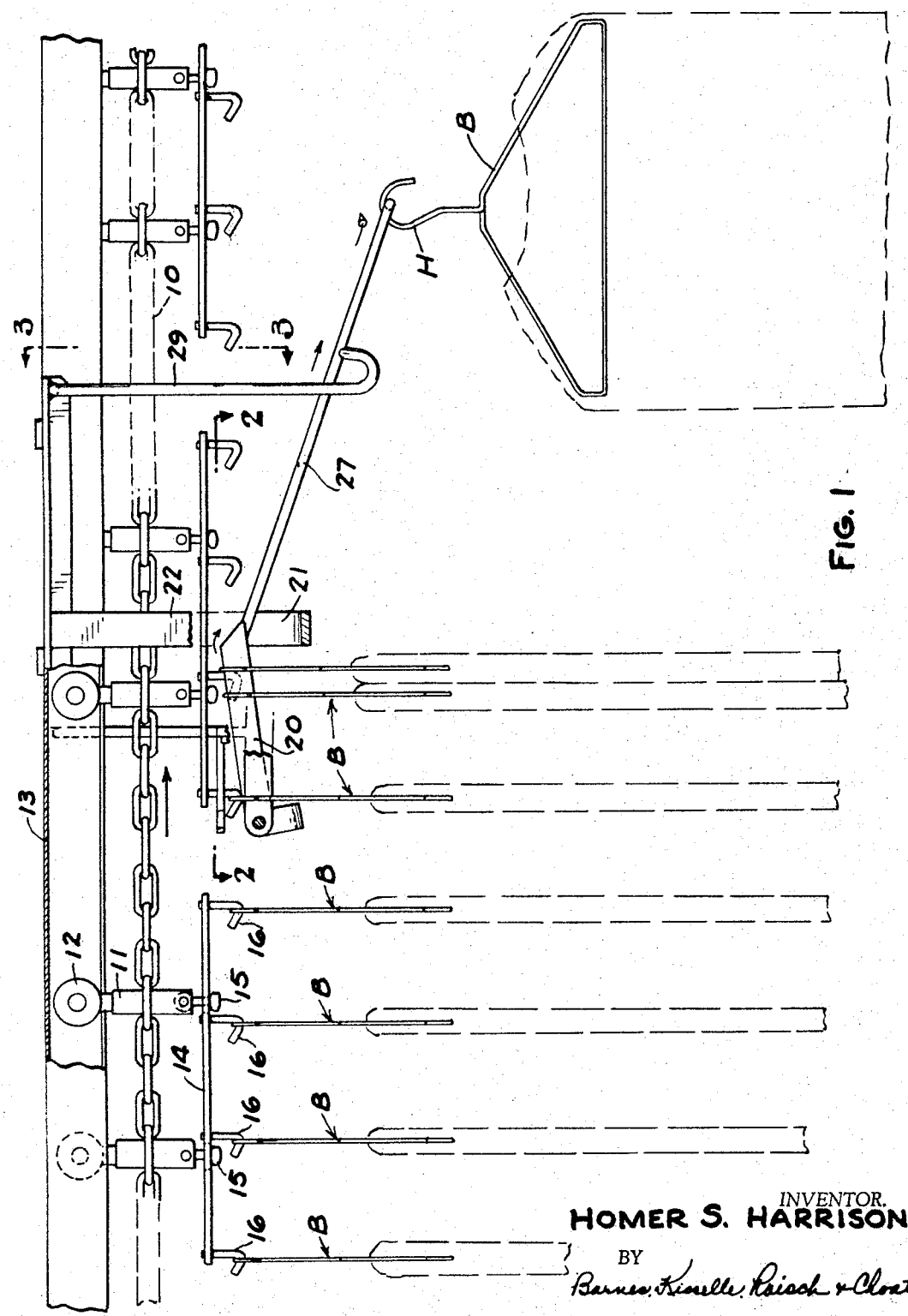
FIG. 1 is a fragmentary partly diagrammatic side elevational view of a garment conveyor embodying the invention.
Figure 6:
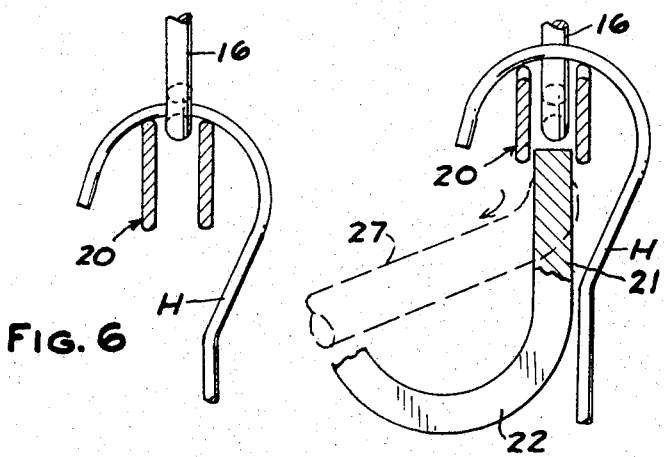
FIG. 6 is a fragmentary sectional view taken along the line 6—6 in FIG. 5.
Figure 7:
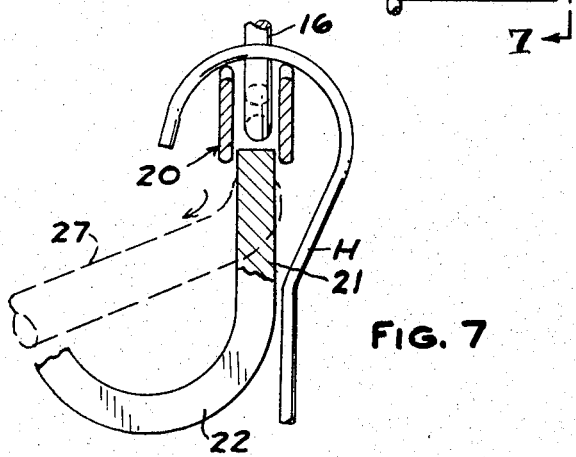
FIG. 7 is a fragmentary sectional view taken along the line 7—7 in FIG. 5.

Referring to FIG. 1, the garment conveyor comprises a chain 10 that is driven from a power source (not shown) and is supported by a plurality of chain trolleys 11 that have rollers 12 engaging a track formed by a channel 13. The trolleys 11 support load bars 14 by means of swivel pins 15. The load bars 14, in turn, have a plurality of longitudinally spaced rearwardly facing hooks 16 thereon that are engaged by the hook portion H of a convention garment hanger that has a hook portion H and a body portion B. An unloading device is provided along the track and includes an unloading bar 20 that is fixed to one leg of a yoke 22 which, in turn, has its other leg pivoted by a pin 23 to a bracket 22 and extends in the direction of movement of the conveyor. The unloading bar 20 comprises spaced members 24, 25 (FIGS. 2, 6 and 7) between which the hooks 16 of the conveyor pass. The unloading bar 20 is movable from a generally horizontal position where the hooks H of the garment hanger clear the bar 20 to an upwardly and forwardly extending position shown in solid lines in FIGS. 1 and 5.

Figure 5:
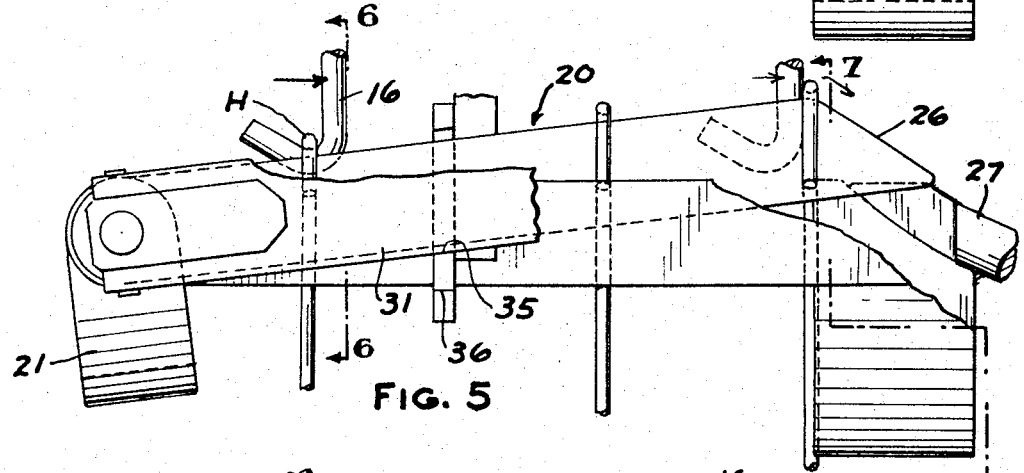
FIG. 5 is a view similar to FIG. 4 showing the relative positions of the parts during unloading.

In the position shown in FIG. 5, as the conveyor moves the hooks 16 having the garment hangers thereon, the hook portions H of the garment hangers are engaged by the unloading bar 20, successively lifted off the hooks 16 out of engagement therewith and frictionally retained on the unloading bar 20. As successive garment hangers are lifted off the hooks, they force the preceding garment hangers on the unloading bar 20 forwardly over the downwardly and forwardly inclined tip 26 of the unloading bar onto an unloading ramp 27. Ramp 27 comprises a rod that is fixed to a yoke 27a on bracket 22 and extends laterally outwardly and downwardly and thereafter transversely as at 28 to an unloading station which is below and to one side of the conveyor so that the garments come to rest at a point which clears the conveyor. As shown in FIG. 3, the unloading ramp is supported by a bracket 29 fixed to bracket 22.

Figure 4:
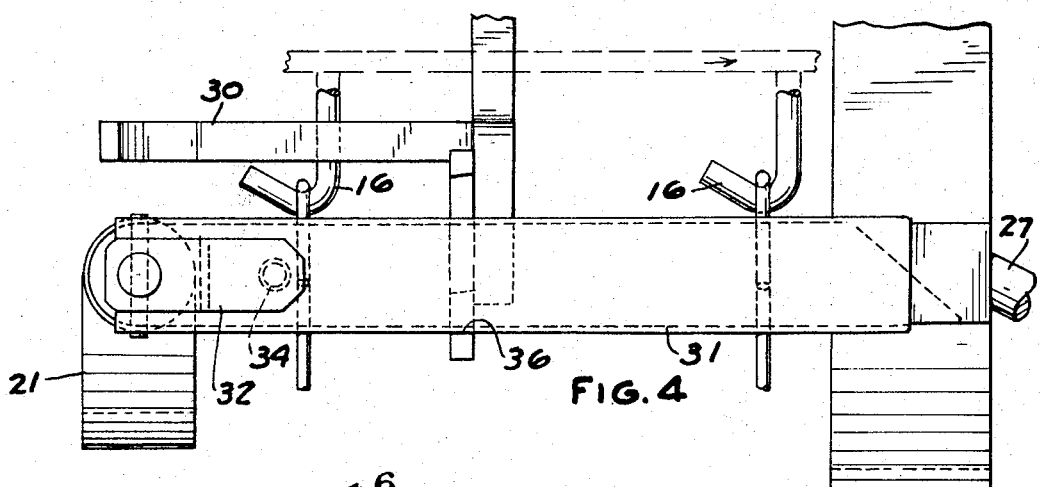
FIG. 4 is a fragmentary side elevational view of a portion of the conveyor shown in FIG. 1 with the parts in a different operative position.

As further shown in FIGS. 2 and 4, spaced guide bars 30 are provided in advance and overlying relationship to the first portion of the unloading bar 20 to guide the hooks 16 between the members 24, 25 of the unloading bar 20.

A handle 31 is pivoted to a bracket 32 fixed on the pin 23 to swing the yoke 21 and, in turn, the support bar 20 to and from unloading position. The handle 31 is pivoted to the bracket 32 by a pin 33 and is yieldingly urged away therefrom by a spring 34. The handle is adapted to engage one of a plurality of notches 35, 36 in a bracket 37 on the bracket 22 to provide detent positions for the two positions of the unloading bar 20.

I claim:
1. In a garment conveyor and the like, the combination comprising
   a conveyor having a plurality of rearwardly extending hooks on which garment hangers having a hook portion and a garment supporting portion are mounted, and an unloading device for unloading said hangers from said hook comprising an unloading bar pivotally mounted about one end thereof for substantially vertical movement into and out of the path of said hook,
   said bar when in the path of said hooks extending upwardly and forwardly and being operable to frictionally engage the hook portion of a garment hanger and thereby cause the garment hanger to be lifted off the hook of the conveyor as the conveyor moves past the unloading bar, a rod defining a ramp adjacent the free end of said unloading bar onto which the garment hangers are successively forced and down which the garment hangers move to an unloading station, successive garment hangers with garments thereon frictionally forcing preceding garment hangers with garmentions thereon off said unloading bar.

2. The combination set forth in claim 1 wherein said ramp extends laterally and downwardly from said conveyor.

3. The combination set forth in claim 1 wherein said ramp includes a portion adjacent the unloading station which extends generally transversely of the path of movement of the conveyor.

4. The combination set forth in claim 1 wherein said unloading bar comprises spaced members between which the hooks of said conveyor move.

5. The combination set forth in claim 4 including guide means overlying said unloading bar for guiding said hooks of said conveyor as they move over said unloading bar.

6. The combination set forth in claim 4 including manually operable detent means for holding said unloading bar in position for unloading said conveyor.

7. The combination set forth in claim 6 wherein said last-mentioned means comprises a lever pivoted to said unloading bar, and spring-loaded detent means operable on said lever.

8. The combination set forth in claim 4 wherein the free ends of said spaced members are tapered downwardly.

References Cited

UNITED STATES PATENTS

| | | | |
|---|---|---|---|
| 736,274 | 8/1903 | Lingo | 198—177 |
| 3,097,391 | 7/1963 | Wayne | 17—44.1 |
| 801,523 | 10/1905 | Hinchman | 198—177 |
| 1,796,127 | 3/1931 | Stephenson | 198—208 |
| 2,916,132 | 12/1959 | Leiser | 198—177 |
| 2,936,061 | 5/1960 | Brunner | 198—177 |
| 3,247,952 | 4/1966 | Kozlosky | 198—188 |

RICHARD E. AEGERTER, *Primary Examiner.*

U.S. Cl. X.R.

198—177, 185